C. BEVILL.
IRRIGATING APPARATUS.
APPLICATION FILED APR. 24, 1909.
959,914.
Patented May 31, 1910.
2 SHEETS—SHEET 1.
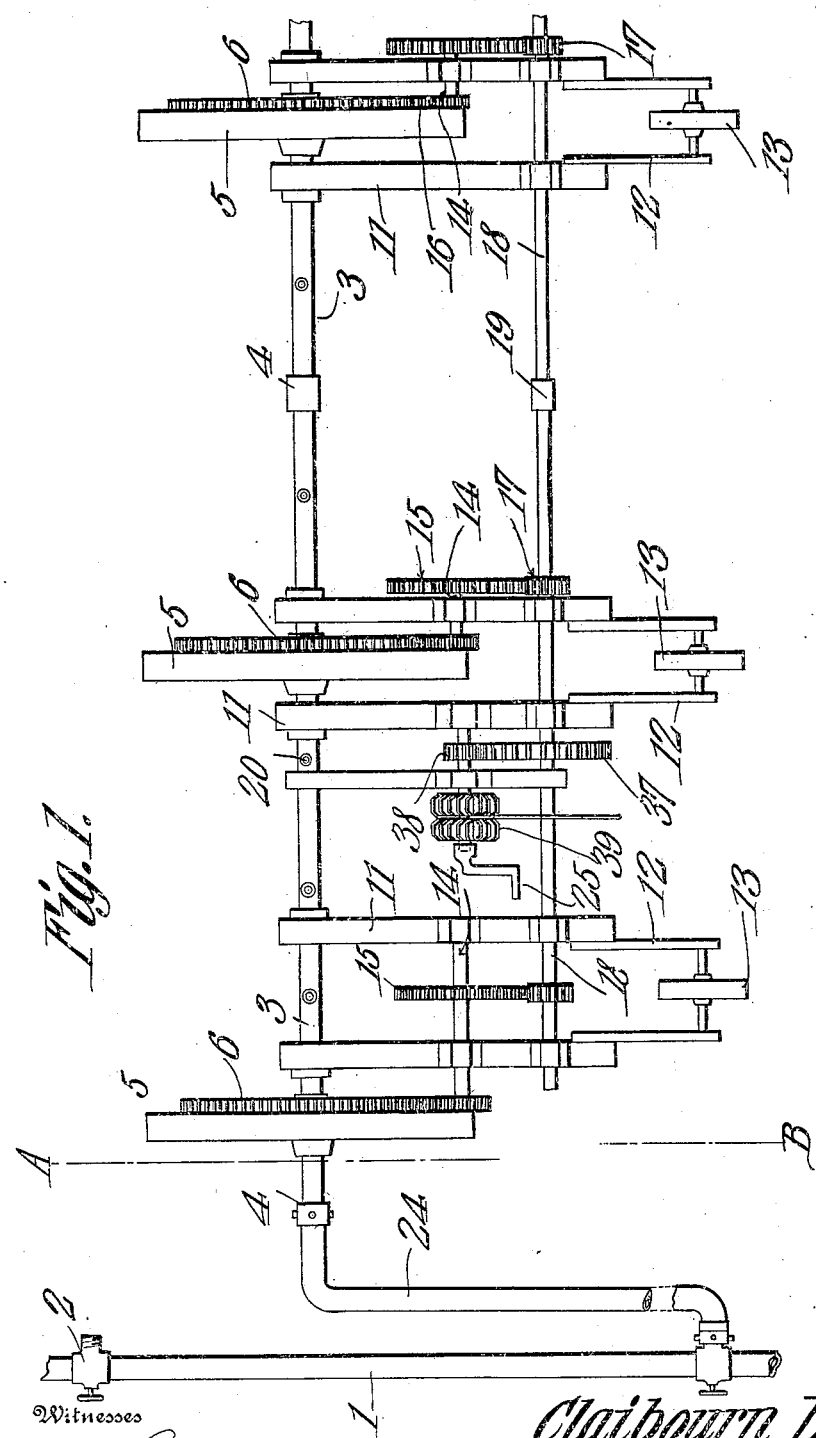

C. BEVILL.
IRRIGATING APPARATUS.
APPLICATION FILED APR. 24, 1909.
959,914.
Patented May 31, 1910.
2 SHEETS—SHEET 2.
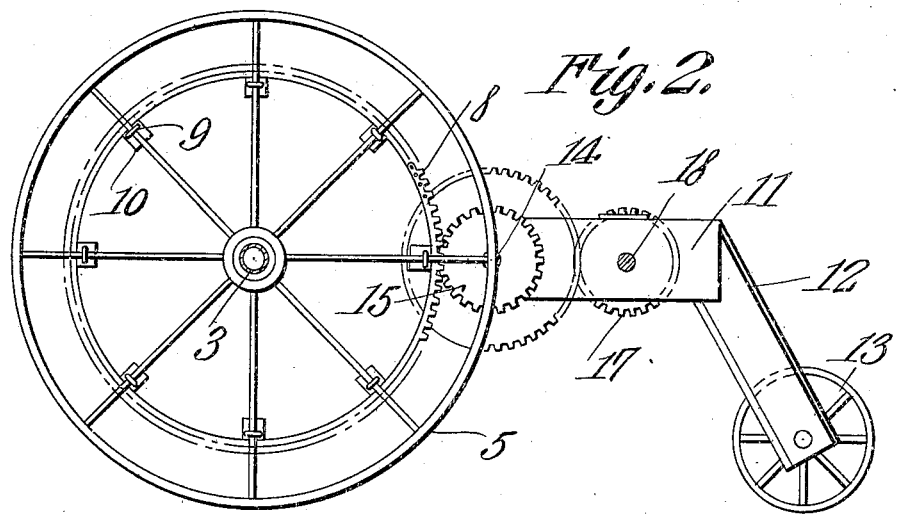
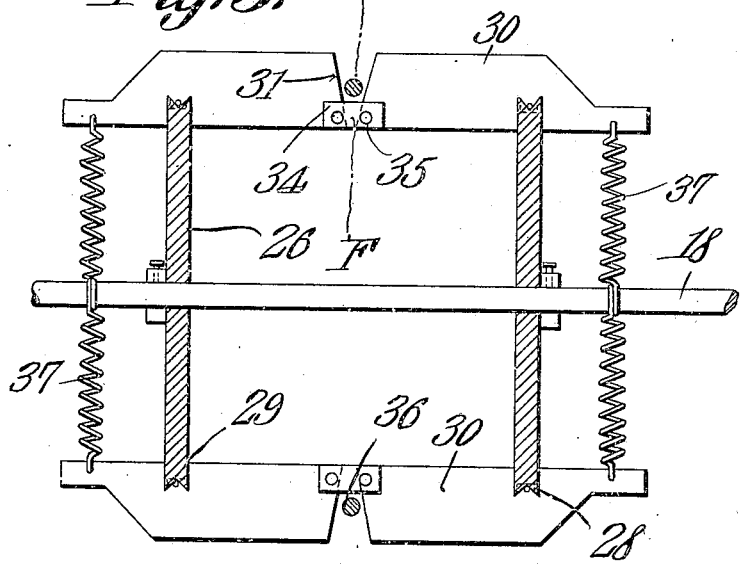
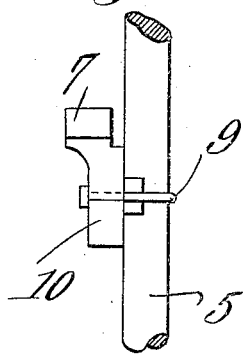
Inventor
Claibourn Bevill.

UNITED STATES PATENT OFFICE.

CLAIBOURN BEVILL, OF BUSHNELL, FLORIDA.

IRRIGATING APPARATUS.

959,914.  Specification of Letters Patent.  Patented May 31, 1910.

Application filed April 24, 1909. Serial No. 492,008.

*To all whom it may concern:*

Be it known that I, CLAIBOURN BEVILL, a citizen of the United States, residing at Bushnell, in the county of Sumter and State of Florida, have invented a new and useful Irrigating Apparatus, of which the following is a specification.

This invention relates to irrigating apparatus and is more especially designed as an improvement upon the apparatus described and claimed in Patent #887,911, issued to me on May 19th, 1908.

The object of the invention is to provide a distributing pipe made up of separable sections, each section being carried by a truck.

A further object is to provide sectional power mechanism mounted on the trucks and having means for receiving power from a flexible power-transmitting element.

With these and other objects in view the invention consists of certain novel details of construction and combination of parts hereinafter more fully described and pointed out in the claims.

In the accompanying drawings the preferred form of the invention has been shown.

In said drawings:—Figure 1 is a plan view of the apparatus. Fig. 2 is a section on line A—B Fig. 1. Fig. 3 is a longitudinal section through the gripping drum of the actuating mechanism, two sets of jaws being shown in elevation and the other jaws being removed. Fig. 4 is a central transverse section through a portion of the drum showing part of one of the heads in elevation, said section being taken on the line E—F Fig. 3. Fig. 5 is a detail view of a portion of one of the gears of the driving mechanism, and its connection with a spoke of a supporting wheel.

Referring to the figures by characters of reference 1 designates a supply pipe which may be extended any desired distance along a field to be irrigated, said pipe being provided at desired intervals with valve outlets 2. The water distributing apparatus is made up of a desired number of similar sections, each of which consists of a distributing pipe 3, upon the end portions of which are arranged coupling members 4, whereby two or more sections may be secured together in alinement. In Fig. 1 two of these sections have been shown connected together, but it is to be understood that any desired number may be utilized. Each of the pipe sections 3 has its end portions extending loosely into the hubs of supporting wheels 5 and each of these wheels has a gear thereon as indicated at 6, said gear consisting of a series of toothed segments 7 held together at their ends by means of cleats 8, bolted or otherwise fastened to the segments, each of the segments being attached to one of the spokes of the wheels 5 by means of a U-shaped bolt 9 engaging a lug or ear 10 extending inwardly from the segment. It will thus be seen that a large gear can be formed at comparatively slight cost and readily secured in position upon the wheels.

Each section 3 extends through one or more frames, each of which consists of parallel beams 11, through one end of each of which the pipe or section 3 extends, while the other ends of the beams have hangers 12 between which is journaled a wheel 13. In the present instance two frames have been shown in connection with each section 3. Each of these frames constitutes a support and bearing for an intermediate shaft 14 carrying gears 15 and 16, the smaller gear 16 meshing with the gear 6 on the adjoining wheel 5, while the larger gear 15 is designed to receive motion from a small gear 17 carried by a power shaft 18. This last mentioned shaft is journaled in both frames of the section 3 and is provided at one end with a coupling 19 whereby it can be securely fastened to the corresponding shaft of the adjoining section. It will thus be seen that when shaft 18 is rotated motion is positively transmitted therefrom through the gears to both wheels of each section 3 and the entire section thus caused to travel forwardly. When a number of sections are connected together the rotation of the shaft 18 will result in the simultaneous rotation of all the wheels 5 of all the sections. Each distributing pipe 3 is preferably provided with a number of nozzles 20 extending upwardly therefrom and designed to produce a spray covering a considerable area. If preferred the distributing pipes 3 may be secured within the beams 11 of the different frames and thus held against rotation. A flexible hose 24 is designed to be coupled at one end to one of the outlets 2 of the supply pipe, while its other end is designed to be connected to one of the end sections 3 by means of a coupling 4. It will be seen therefore that the entire apparatus is free to be moved backward or forward as long as desired and within the limit of the length of the hose 24. After the area covered by such movement has been sufficiently irrigated by this backward or forward movement, the hose 24 may be uncoupled from the pipe 1 and secured to the next adjoining outlet 2. One of the shaft sections 18 has a gear 37 thereon which meshes with a smaller gear 38, secured to a main shaft 39, which is journaled upon the frame of the apparatus.

If desired, the shaft 39 may be rotated manually by placing a crank 25 in engagement with one end thereof, as indicated by dotted lines in Fig. 1. If preferred, however, the shaft 39 can be actuated by a suitable motor which may be located at one end of the field and utilized to drive a cable. Where a cable is employed it is necessary to provide a drum such for example as indicated in Figs. 1, 3 and 4. This drum, which is secured upon one end of shaft 39, consists of two disk-like heads 26, each of which has radial slots in the peripheral portion thereof, said slots being indicated at 27. The heads are formed with annular grooves 28 constituting seats for rings 29, and these rings extend across the slots 27 and constitute pivots for jaws 30 arranged in pairs, the jaws of each pair being disposed normally in alinement. The inner ends of these jaws are preferably beveled as shown at 31 in Fig. 3 and located adjacent the transverse center of the drum, the ends being loosely connected by coupling plates 34 mounted on lugs 35 extending laterally from the jaws. Said plates constitute bearings for the cable extending around the drum and are designed, when power is applied to the cable, to be pressed inwardly toward the shaft 39 and thus cause the beveled ends 31 of the jaws 30 to move inwardly against and grip the cable so as to prevent it from slipping upon the drum. As heretofore stated this cable, which is indicated at 36, is secured at one end to the driving mechanism of the motor. The other end of the cable is designed to be held taut but to be paid out as necessary so that as the cable is wound up by the motor it will cause the rotation of the drum and its shaft 39 and cause the mechanism carried by the various frames to be set in motion to rotate the wheels 5 and move the entire apparatus in a direction away from the motor. Coiled springs 37 may be connected to shaft 18 and to the outer ends of the jaws 31 so as to hold the jaws normally in the position shown in Fig. 3.

By utilizing apparatus such as herein described it will be seen that all portions thereof can be caused to be moved backward or forward simultaneously and the area covered by the apparatus may be practically unrestricted, it being dependent solely upon the number of sections 3 utilized and the length of the supply pipe 1.

Obviously various changes may be made in the construction and arrangement of the parts without departing from the spirit or sacrificing the advantages of the invention.

What is claimed is:—

1. Irrigating apparatus comprising a series of detachably connected alining distributing pipes, supporting wheels for each pipe, said pipe extending through the wheels, a truck supported at one end by each pipe, a drive shaft journaled upon each truck, the shafts of the trucks being disposed in alinement and detachably connected, and mechanism carried by each truck for transmitting motion from said shafts to the supporting wheels.

2. Irrigating apparatus comprising a sectional distributing pipe, non-flexible couplings holding the sections of the pipe substantially in alinement, these sections being detachably connected, wheels constituting supports for each section, a truck movable with each section, a shaft journaled upon each truck, means detachably connecting the shafts for insuring simultaneous rotation thereof, means for actuating the shafts, and means upon each truck for transmitting motion from its shaft to the wheels adjacent thereto.

In testimony that I claim the foregoing as my own, I have hereto affixed my signature in the presence of two witnesses.

CLAIBOURN BEVILL.

Witnesses:
 W. F. NOBLE,
 WM. HINES.